May 1, 1945.                C. F. ROCHEVILLE                2,374,897
                                COMPRESSOR
                            Filed Jan. 21, 1943            2 Sheets-Sheet 1
Fig. 2.
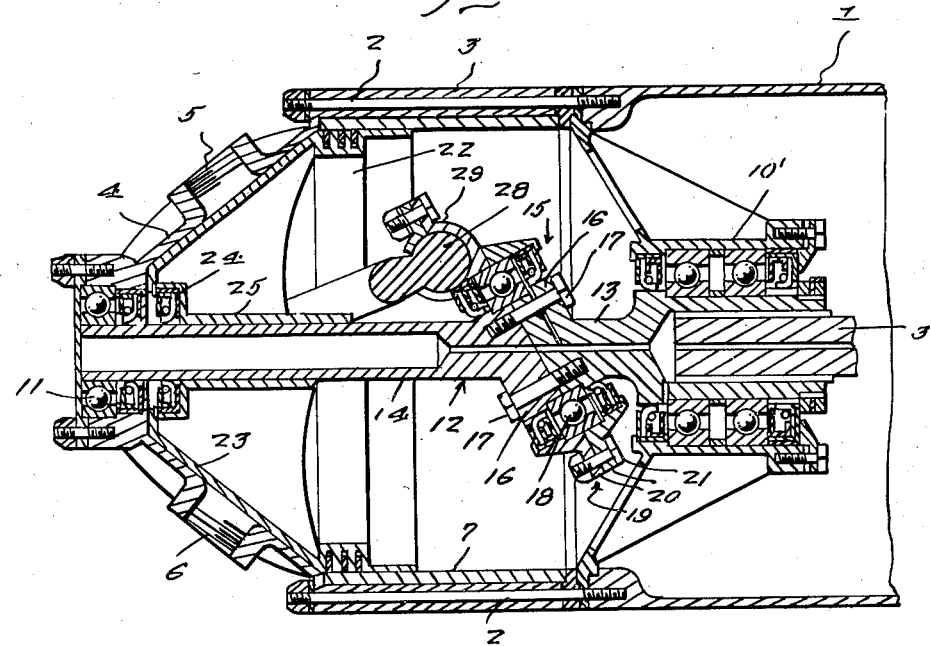
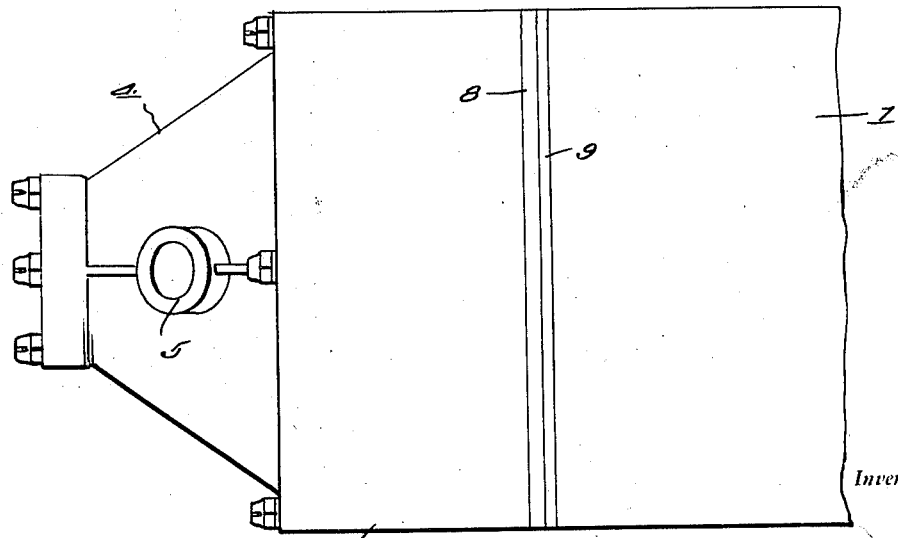
Fig. 1.
Inventor
Charles F. Rocheville
By Clarence A. O'Brien
and Harvey B. Jacobson
Attorneys May 1, 1945.   C. F. ROCHEVILLE   2,374,897
COMPRESSOR
Filed Jan. 21, 1943   2 Sheets-Sheet 2
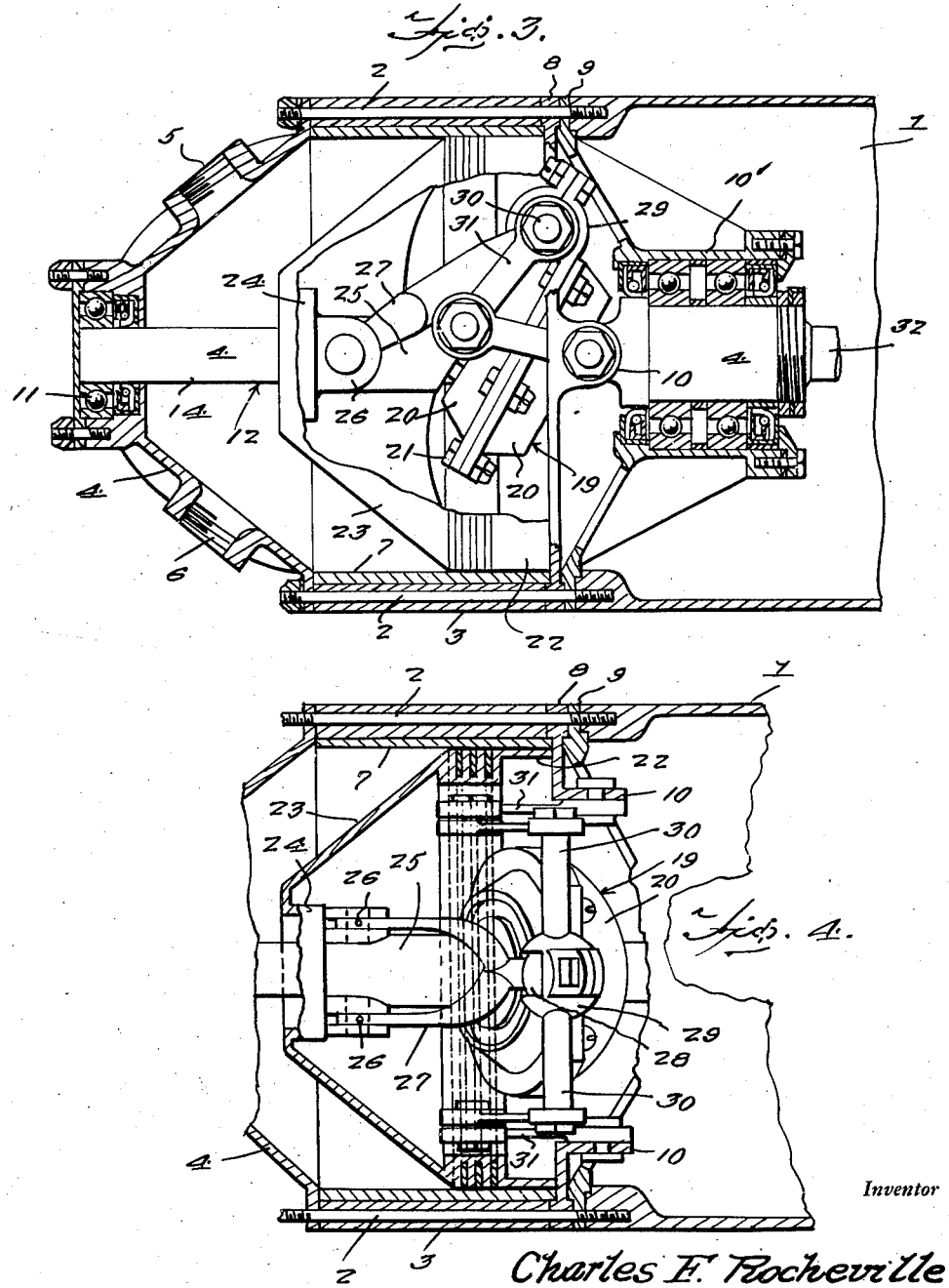
Inventor
Charles F. Rocheville
By Clarence A. O'Brien
and Harvey B. Jacobson
Attorneys Patented May 1, 1945

2,374,897

UNITED STATES PATENT OFFICE 2,374,897

COMPRESSOR

Charles F. Rocheville, Long Beach, Calif., assignor to Rocheville Engineering, Inc., Long Beach, Calif.

Application January 21, 1943, Serial No. 473,126

1 Claim. (Cl. 230—214)

The present invention relates to new and useful improvements in compressors of the reciprocating piston type, and has for its primary object to provide, in a manner as hereinafter set forth, a device of this character comprising novel means for actuating the piston.

Other objects of the invention are to provide a compressor of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a compressor constructed in accordance with the present invention.

Figure 2 is a view in vertical longitudinal section through the device.

Figure 3 is a view in horizontal section but showing the piston broken away and in retracted position.

Figure 4 is a fragmentary view in horizontal section, taken substantially on the line 4—4 of Figure 3.

Referring now to the drawings in detail, it will be seen that the embodiment of the invention which has been illustrated comprises a cylindrical case 1 of suitable dimensions and material. Removably secured by bolts 2 on one end of the case 1 is a cylinder 3 comprising a substantially frusto-conical head portion 4 having inlet and outlet ports 5 and 6, respectively, therein. The cylinder 3 further includes, in its bore, a liner 7.

Rings 8 and 9 are mounted between the case 1 and the cylinder 3, said rings having aligned openings therein which accommodate the bolts 2. The ring 8 has formed therein longitudinally extending ears 10 the purpose of which will be presently set forth. The ring 9 carries a bearing 10' which is centrally located in the case 1 and which is longitudinally aligned with a bearing 11 in the forward end portion of the cylinder head 4.

A shaft 12 is journaled in the bearings 10 and 11. The shaft 12 comprises longitudinally aligned sections 13 and 14, the former being journaled in the bearing 10, the latter being journaled in the bearing 11. The shaft sections 13 and 14 are connected by an oblique joint 15. The shaft joint 15 includes opposed flanges 16 which are secured together by bolts 17.

The joint 15 has mounted thereon a ball bearing 18. Journaled on the ball bearing 18 is an annular housing 19. The housing 19 includes complemental half sections 20 which are secured together by bolts 21. It will be observed that the inner race of the ball bearing 18 is clamped between the flanges 16 of the joint 15.

The forward section 14 of the shaft 12 is rotatable in a piston 22 which is mounted for reciprocation in the cylinder 3. The piston 22 includes a substantially frusto-conical head 23 which is engageable in the correspondingly shaped cylinder head 4. A bearing 24 is provided in the forward portion of the cylinder head 23 for the shaft 12. Extending rearwardly from the bearing 24 is a guide sleeve or bearing 25 which travels on the shaft 12.

Pivotally secured at 26 in the head portion of the piston 22 is a substantially Y-shaped connecting rod 27. It will be noted that the yoke portion of the connecting rod 27 straddles the tubular guide or sleeve 25. The shank or stem of the connecting rod 27 terminates in a ball 28 (see Figure 2) which is journaled in a socket 29 which is provided therefor on the housing 19. Thus, the piston 22 is connected to the rotary shaft 12 for reciprocation thereby.

In the embodiment which has been shown, pins 30 project in opposite directions from the ball 28, the socket 29 having openings therein which accommodate said pins. Toggles 31 are pivotally connected to the pins 30 and the ears 10 for retaining the housing 19, the piston 22, etc. against rotation with the shaft 12.

It is thought that the operation of the compressor will be readily apparent from a consideration of the foregoing. Briefly, a shaft 32 from any suitable source of power drives the shaft 12. As hereinbefore stated, as the shaft 12 rotates the housing 19, which is journaled on the oblique joint 15 is secured against rotation with said shaft by the toggles 31. Thus, the housing 19 is caused to describe what may be considered a wobbling motion on the shaft 12 which is converted to a reciprocating movement of the piston 22 in the cylinder 3 through the connecting rod 27.

It is believed that the many advantages of a compressor constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

Having described the invention, what is claimed as new is:

A compressor comprising a cylinder, a reciprocating piston in the cylinder, an axial shaft in the cylinder including a pair of aligned sections, an oblique joint connecting said sections, a housing surrounding said joint and in which said joint is rotatably mounted, a piston rod having a ball and socket connection to said piston and housing, and means to restrain the housing against rotation comprising a pair of pins extending oppositely from said ball through said socket, a ring fixed in said cylinder, and pair of toggles connecting each pin to said ring.

CHARLES F. ROCHEVILLE.